(12) United States Patent  (10) Patent No.: US 7,761,685 B2
Jeffrey  (45) Date of Patent: Jul. 20, 2010

(54) COMPRESSING AND DECOMPRESSING IMAGE DATA WITHOUT INTRODUCING ARTIFACTS

(75) Inventor: Eric Jeffrey, Richmond (CA)

(73) Assignee: Seiko Epson Corporation, Tokyo (JP)

( * ) Notice: Subject to any disclaimer, the term of this patent is extended or adjusted under 35 U.S.C. 154(b) by 420 days.

(21) Appl. No.: 11/942,787

(22) Filed: Nov. 20, 2007

(65) Prior Publication Data

US 2009/0132782 A1  May 21, 2009

(51) Int. Cl.
 *G06F 12/00* (2006.01)
(52) U.S. Cl. ............................................. 711/173
(58) Field of Classification Search ............... None
 See application file for complete search history.

(56) References Cited

U.S. PATENT DOCUMENTS

| | | | |
|---|---|---|---|
| 4,156,908 A * | 5/1979 | Missios et al. ........... 707/104.1 |
| 5,764,373 A | 6/1998 | Matoba et al. |
| 6,674,447 B1 * | 1/2004 | Chiang et al. ............... 715/704 |
| 6,850,648 B2 | 2/2005 | Suzuki |
| 6,937,276 B2 | 8/2005 | Chung |
| 6,940,739 B2 * | 9/2005 | Mizuno et al. ................ 365/63 |
| 7,248,267 B2 * | 7/2007 | Marion et al. ............... 345/542 |
| 2005/0223175 A1 * | 10/2005 | Hepner et al. ............... 711/137 |

* cited by examiner

*Primary Examiner*—Hiep T Nguyen
(74) *Attorney, Agent, or Firm*—Mark P. Watson (57) ABSTRACT

An apparatus may include a memory to store a first frame, a buffer to store at least one portion of a second frame previously stored in the memory, and first and second units to, respectfully, store and fetch data. The first unit may copy a datum of the second frame stored at a particular location in the memory to the buffer. The first unit may then store a datum of a first frame at the particular location. The second unit may fetch a datum of a second frame from a selected location. If a write-segment pointer and a read-segment pointer identify the same memory segment, and the read-data pointer is greater than the write-data pointer, the memory may be selected. If the write-segment pointer and the read-segment pointer identify the same memory segment, and the write-data pointer is greater than the read-data pointer, the buffer may be selected. In addition, if the write-segment pointer and the read-segment pointer identify different memory segments, either the memory or the buffer may be selected depending on additional criteria.

20 Claims, 8 Drawing Sheets

COMPRESSING AND DECOMPRESSING IMAGE DATA WITHOUT INTRODUCING ARTIFACTS

FIELD

The present disclosure relates generally to compressing and decompressing data, and in particular, to compressing and decompressing image data without introducing artifacts.

BACKGROUND

Data compression (or coding) is the process of encoding a particular quantity of source information using fewer bits than are used for the un-encoded information. A wide variety of data compression techniques are known. A data compression technique may divide a given quantity of source data into portions and compress each portion individually. In image display systems, data compression techniques may be used to compress digital image data before storing or transmitting the data. Data compression is favored because the quantity of data to be stored or transmitted can be significantly reduced. When compressed data is fetched from memory or received from a transmitter, the data must be decompressed (or decoded) before it can be used. The process of decoding compressed data is generally the inverse of the coding process.

In some image display systems, image data may be compressed and stored in a memory as it is received, and read from memory and decompressed as it is needed by a display device, where the storing and reading functions are not synchronized.

SUMMARY

I have observed that a particular artifact sometimes occurs on a display screen in an image display system employing a memory for storing compressed image data where the storing and reading functions are not synchronized. This artifact may appear as one or more areas of black, white, or solid color in the rendered image. When a sequence of images is rendered as video on a display device, the artifact may appear momentarily as streaks of non-source pixels in one or more areas of the display. These artifacts are especially noticeable. Accordingly, a solution to this problem is plainly needed. However, in certain systems it is generally not possible to solve the problem by synchronizing the storing and reading functions, because these functions are asynchronous.

An apparatus embodying principles of the invention may prevent these artifacts. The apparatus may store and read a sequence of at least two frames. The frames may be comprised of compressed image data. In addition, each frame may be divided into a sequence of portions, and each portion may be individually compressed. The apparatus may include a memory to store a frame, a buffer to store at least one portion of a frame, and first and second units to store and fetch data. Portions of the memory ("segments") may be allocated to store respective compressed portions of a frame.

The first unit may copy a datum stored at a particular location in the memory to the buffer. The first unit may then store a datum of a first frame at the particular location. A write-segment pointer and a write-data pointer may be generated.

The second unit may fetch a datum of a second frame from a selected location. A read-segment pointer and a read-data pointer may be generated. If (a) the write-segment pointer and the read-segment pointer identify the same memory segment, and the read-data pointer is greater than the write-data pointer, the memory may be selected, and if (b) the write-segment pointer and the read-segment pointer identify the same memory segment, and the write-data pointer is greater than the read-data pointer, the buffer may be selected.

In addition, if the write-segment pointer and the read-segment pointer identify different memory segments, the memory may be selected. Further, if (a) the write-segment pointer and the read-segment pointer identify different memory segments for the datum of the second frame, and if (b) there exists a previous datum within the segment identified by the read-segment pointer for the second frame datum for which (i) the write-segment pointer and the read-segment pointer identify the same memory segment, and (ii) the write-data pointer is greater than the read-data pointer, the buffer may be selected.

In one embodiment, the buffer stores two portions. Further, the buffer may be separate from the memory. In addition, in one embodiment, the portions correspond with lines of a frame of image data.

It is to be understood that this summary is provided as a means of generally determining what follows in the drawings and detailed description and is not intended to limit the scope of the invention.

BRIEF DESCRIPTION OF THE DRAWINGS

In the drawings and description below, the same reference numbers are used in the drawings and the description generally refers to the same or like parts, elements, or steps.

DETAILED DESCRIPTION

Figure 1:
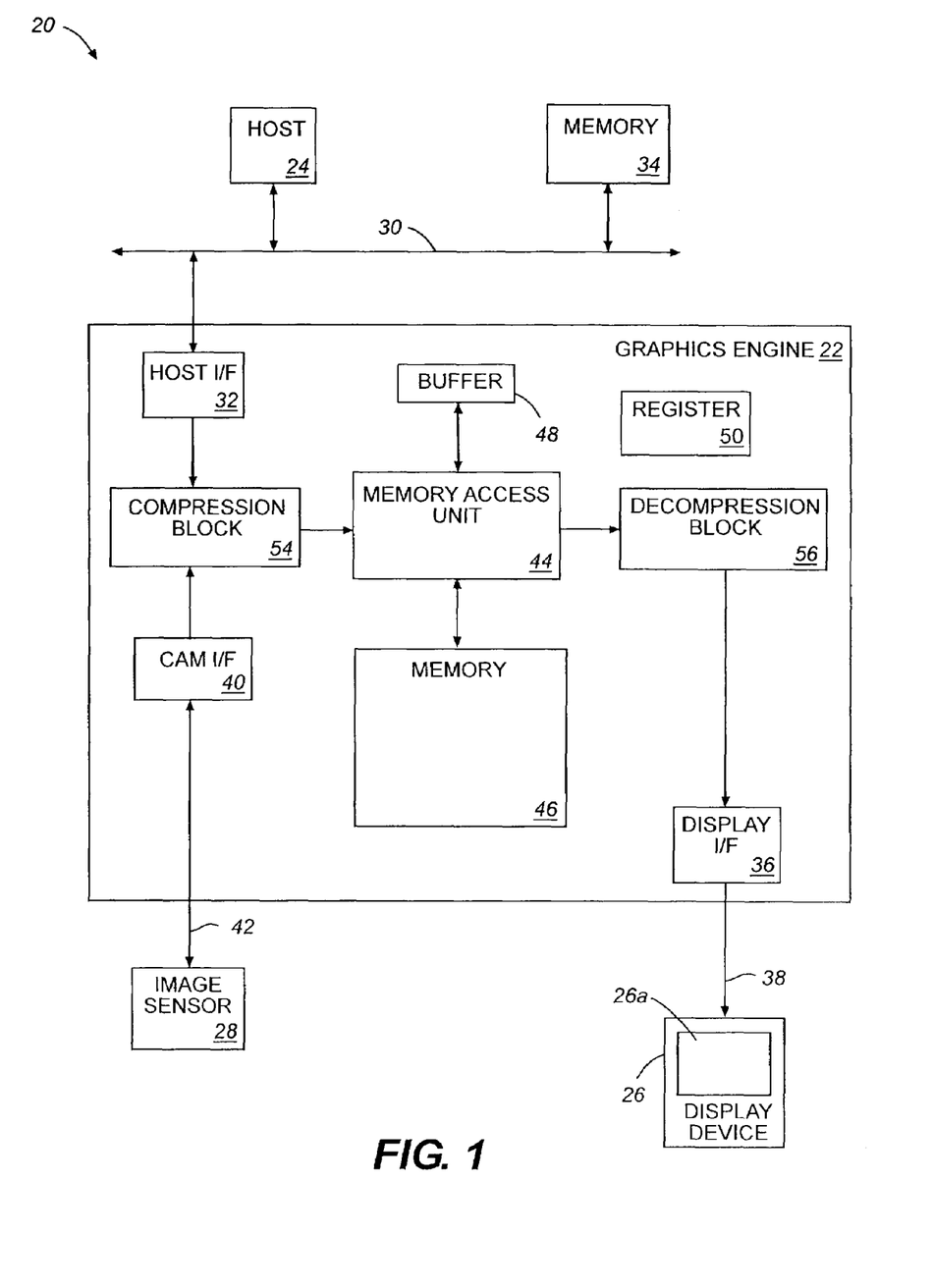
FIG. 1 is a simplified block diagram of an exemplary graphics display system, which includes a graphics engine embodying principles of the invention.

FIG. 1 is a simplified block diagram of an exemplary display system 20 embodying principles of the invention. The system 20 may be a mobile device (defined below). Where the system 20 is a mobile device, it is typically powered by a battery (not shown). The system 20 may include an exemplary graphics engine 22, a host 24, at least one display device 26, and one or more image data sources, such as an image sensor 28.

The graphics engine 22 interfaces the host 24 and the image sensor 28 with the display device 26. In one embodiment, the graphics engine 22 is a separate integrated circuit from the remaining elements of the system, that is, the graphics engine 22 may be remote from the host, the image sensor, and the display device.

The host 24 may be a microprocessor, a digital signal processor, a CPU, a computer, or any other type of device or machine that may be used to control or direct some or all of the operations in a system. Typically, the host 24 controls operations by executing instructions that are stored in or on a machine-readable medium. The host 24 communicates with the graphics engine 22 over a bus 30 to a host interface 32 within the graphics engine 22. The bus 30 operates at a bus clock speed. The host 24 may write commands and data to the host interface 32 at the bus clock speed. The host 24 may pause in the middle of writing data to the graphics engine 22, for example, such as when the host 24 is interrupted to perform another task. Generally, the graphics engine 22 is not able to control or determine when it will receive commands or image data from the host 24.

Other devices may be coupled with the bus 30. For instance, a system memory 34 may be coupled with the bus 30. The system memory 34 may, for example, store instructions or data for use by the host 24 or image data that may be rendered using the graphics engine 22. The memory 34 may be an SRAM, DRAM, Flash, hard disk, optical disk, floppy disk, or any other type of memory.

A display device interface 36 is included in the graphics engine 22. The display device interface 36 provides an interface between the graphics engine 22 and the display device 26. A display device bus 38 couples the graphics engine 22 and the display device 26. A Liquid Crystal Display ("LCD") is typically used as the display device in mobile devices, but the display device 26 may be any type of display device (defined below). An image may be rendered on a display screen 26a of the exemplary display device 26. The display screen 26a is refreshed a certain number of times per second, and has a particular resolution. For example, the display screen 26a may be refreshed 60 times per second and have a resolution of 160×128 pixels. In order for the display device 26 to be refreshed at the required rate, it needs to be furnished with pixels at a specific ("pixel clock") rate. For example, the display device interface 36 may write pixels to the display device 26 at a pixel clock rate of about 268.8 kHz. Displays having a larger resolution or higher refresh rate require correspondingly faster pixel clock rates. A display device having a resolution of 1024×480 would require a pixel clock rate of about 34.4 MHz in order to refresh the display screen 26a at 70 Hz. The display device 26 may have any resolution and refresh rate. The display device bus 38 may operate at a pixel clock speed, the display bus pixel clock rate being determined generally by the requirements of the particular display device. Further, the graphics engine 22 may not pause in the middle of writing data to the display device 26 without causing artifacts in the displayed image.

The image sensor 28 may be, for example, a charge-coupled device or a complementary metal-oxide semiconductor sensor. A camera interface 40 ("CAM I/F") is included in the exemplary graphics engine 22. The camera interface 40 is coupled with the image sensor 28 and receives image data output on data lines of a bus 42. Typically, the camera interface 40 also receives vertical and horizontal synchronizing signals from the image sensor 28 and provides a clocking signal ("camera-pixel clock") to the image sensor 28 for clocking image data out of the sensor. These signals may be transmitted via the bus 42 or via a separate bus (not shown). The pixel clock rate for the exemplary image sensor 28 is determined generally by the requirements of the particular image sensor. An exemplary image sensor with a resolution of 352×288 pixels may have, for example, a minimum, typical, and maximum camera pixel-clock rates, respectively, of 4, 13, and 32 MHz. Similarly, the frame rate for the exemplary image sensor 28 is determined generally by the requirements of the particular image sensor. An exemplary image sensor, for example, has a maximum frame rate of 15 frames per second. The image sensor 28 may have any desired resolution, frame rate, and camera-pixel clock rate. The bus 42 may operate at an image sensor pixel clock speed. The graphics engine 22 may not pause in the middle of receiving data from the image sensor 28 without a loss of some of the data sent by the image sensor, which typically causes artifacts in the displayed image.

The graphics engine 22 may also include a memory access unit 44, a memory 46, a buffer 48, a register set 50, a compression block 54, and a decompression block 56, each of which is further described below.

The memory access unit 44 may be coupled with the memory 46, buffer 48, and the compression and decompression blocks 54, 56, as shown. In addition, the memory access unit 44 may have access to the contents of the register set 50. The memory access unit 44 may control the writing, and the reading of image data. In addition, a memory access unit according to the present disclosure may determine the location where image data is to be fetched, as described below, i.e., from the memory 46 or from the buffer 48. Alternatively, one or more of the functions of the memory access unit 44 may be included in the compression block 54, the decompression block 56, or in another unit.

The memory 46 may be used for storing a frame of image data, i.e., it may be a "frame buffer." In particular, the memory 46 may be used for storing a frame of compressed or coded image data. It is not essential that the frame buffer 46 be disposed within the graphics engine 22. In alternative embodiments, the frame buffer 46 may be remote from the graphics engine. While the frame buffer 46 may be used for storing image data, it may also be used for storing other types of data. The capacity of the frame buffer 46 may vary in different embodiments. In one embodiment, the frame buffer 46 has a capacity which is sufficient to store no more than one frame of compressed image data at a time, the frame size being defined by the display device 26 and the compression method. In another embodiment, the frame buffer 46 has a capacity to store one frame of compressed image data and some additional data, but the capacity is not sufficient to store two frames of compressed image data. In an alternative embodiment, the frame buffer 46 may have a capacity which is sufficient to store more data than a single frame of compressed image data. The frame buffer 46 may be of the SRAM type. In addition, the frame buffer 46 may also be a DRAM, Flash memory, hard disk, optical disk, floppy disk, or any other type of memory.

The buffer 48 may be distinct from or included within the frame buffer 46. The register set 50 may be employed to store a read-pointer address and a write-pointer address.

The compression block 54 compresses and the decompression block 56 decompresses image data. The compression block 54 typically compresses a particular quantity of source data into an amount of compressed (coded) data that varies depending on the nature of the data. The compression block 54 may employ any suitable compression technique. In addition, the compression block 54 may employ two or more compression techniques, individually or in combination. The decompression block 56 decompresses compressed data using a technique that is the inverse of the technique used by the compression block 54.

The host 24 or the image sensor 28 may store image data for display in the frame buffer 46 via the host and camera interfaces 32 and 40, respectively. The image data stored by the host 24 or the image sensor 28 may be first coded by the compression block 54 prior to storing. Accordingly, the host interface 32 and the camera interface 40 may be coupled with the compression block 54 as shown. It is desirable to compress image data received from these sources because the quantity of data that needs to be stored can be significantly reduced. Thus, the graphics engine 22 may be provided with a smaller frame buffer 46 than would otherwise be required. Compressed image data stored in the frame buffer 46 must be decompressed before it is presented to the display interface 36 for rendering on the display device 26. The decompression block 56 performs the decompression function and, accordingly, may be coupled with the display interface 36.

The general operation of the graphics engine 22 is subject to the constraints mentioned above. These constraints include the following. The graphics engine 22 is not able to control or determine when it will receive image data from the host 24, or when the host may pause in the middle of transmitting data. The graphics engine may not adjust the clock speed of the bus 30. Nor may the graphics engine 22 pause or change the camera pixel clock rate at which image data is received from the image sensor 28. Further, the graphics engine 22 may not pause or change the pixel clock rate used to write image data to the display device 26. In addition, the data source side and the display side may operate at different frame and pixel clock rates. For these reasons, it is generally not possible to synchronize image data input to the graphics engine 22 with image data output from the graphics engine.

Before proceeding, it may be helpful to briefly review the general nature of image data and how such data may be grouped for data compression. An image on a display device is formed from small discrete elements known as "pixels." The attributes of each pixel, such as its brightness and color, are represented by a numeric value, which is typically represented in binary form. Thus, an image may be considered a two-dimensional array of binary elements of data, which may be referred to as a "frame." The term pixel may be used herein to refer to the display elements of a display device, the imaging elements in an image sensor, the binary elements of data that define the attributes of display or imaging elements, the appropriate sense of the term being clear from the context. A pixel may be represented by any number of bits. A common number for color pixels is 24 bits, though fewer bits are also frequently used. A color pixel may be of the RGB type, having three 8-bit values corresponding with red, blue, and green components. A color pixel may also be of the YUV type, having three 8-bit values corresponding with luma, and two color difference components. Other types of color pixels are known, as well as various types of gray-scale pixels.

The pixels in a frame are typically transmitted from an image data source, e.g., a host or an image sensor, to a display device in raster order. In raster order, pixels are transmitted sequentially one line at a time, from top to bottom. The transmission of each line begins with the left-most pixel. In a line of 100 pixels, the left-most pixel may be pixel one and the right-most pixel may be pixel 100. With respect to any two pixels in the line, the pixel to the left of the other pixel, i.e., the pixel with the lower sequential value, is read out for display ahead of the other pixel.

A data compression technique may divide a large group of data, e.g., a frame, into smaller portions and compress each portion individually. The term "portion," as used in this disclosure and in the claims, means, when referring to data, the subset of a frame of source data that is individually compressed and decompressed. In one embodiment, a portion may be one of the lines of a frame. Alternatively, a portion may be less than one of line of a frame, e.g., one-half of a line, one-third of a line, etc., or a portion may be more than one of line of a frame, e.g., two lines, three lines, etc. Further, a portion may include all, or fewer than all, of the pixels of two or more lines, e.g., an n×m block of pixels.

A portion generally includes two or more data elements (or "datum"). In an example above, a line of image data is comprised of 100 pixels. Continuing the example, one portion may be 100 pixels corresponding to one line of a source image. A data compression technique that divides a large group of data into portions and codes each portion individually will generally produce two or more coded data elements for each portion. In other words, a compressed portion typically includes a smaller number of data elements than the corresponding uncompressed, source portion. Instead of a portion of 100 pixels of a source image, the coded portion may have, for example, 75, 50, or 25 data elements. Like a line of raster-ordered pixels, the data elements of a compressed portion are ordered in a raster-like sequence. For example, the left-most compressed data element may be data element one and the right-most data element may be data element 50. With respect to any two compressed data elements in a line, the data element to the left of the other data element, i.e., the data element with the lower sequential value, may be transmitted or read from memory for decoding ahead of the other data element.

In one embodiment, the compression block 54 compresses portions that are one of the lines of a frame of image data. The compression block 54 thus generates a coded portion as each line of a source frame is received. Each line of the frame has a sequential position in the raster order so each coded portion has a sequential position in the raster order of a frame. The amount by which each line is compressed varies, but the compression algorithm employed may guarantee that a maximum compressed size will not be exceeded. Thus, a segment, i.e., a fixed amount of space, in the frame buffer 46 may be allocated for each coded portion. For example, a source image may be a 100×120 pixel image and each pixel is represented by 20 bits. Assume that the compression block 54 separately codes each of the 120 lines and that each uncompressed portion is 2000 bits. The compression algorithm employed may guarantee that each portion, after coding, will be no more than 1000 bits. Thus, 120 segments, each sufficient to store 1000 bits, may be reserved in the memory 46 for storing the 120 portions. When compressed portions are stored in the frame buffer 46, the amount of memory used varies depending on how much the compression block 54 was able to compress the portions. For instance, a particular coded portion may be 900 bits, occupying ninety percent of a memory segment, while another coded portion may be only 500 bits, requiring fifty percent of a memory segment.

In one embodiment, a compression/decompression algorithm employed in the compression and decompression blocks 54, 56 may use information from previous data in a data stream, i.e., data received earlier in time. In one embodiment, the compression and decompression blocks 54, 56 code and decode, respectively, the $M^{th}$ data element of a portion using the $(M-1)^{th}$ coded/decoded data element of that portion. As one example of an algorithm, in a Differential Pulse Code Modulation ("DPCM") method, a coder and a decoder include a predictor that is used to predict the value of sample codes. In the coder, the predictor is used to predict the value of a sample, and the actual value of the sample is subtracted from the predicted value to produce an error. The coder transmits the errors to the decoder. The predictor in the decoder predicts the value of the corresponding sample using information from previously received data and adds the predicted value to the error to produce the decoded value of the sample. As another example of an algorithm, a Lempel-Ziv type method encodes subsequent elements in a data stream using previous elements in the data stream. It is contemplated that image corruption may be prevented according to the present disclosure with any algorithm that uses information from previous data in a data stream and not only the two algorithms mentioned here.

Figure 2:
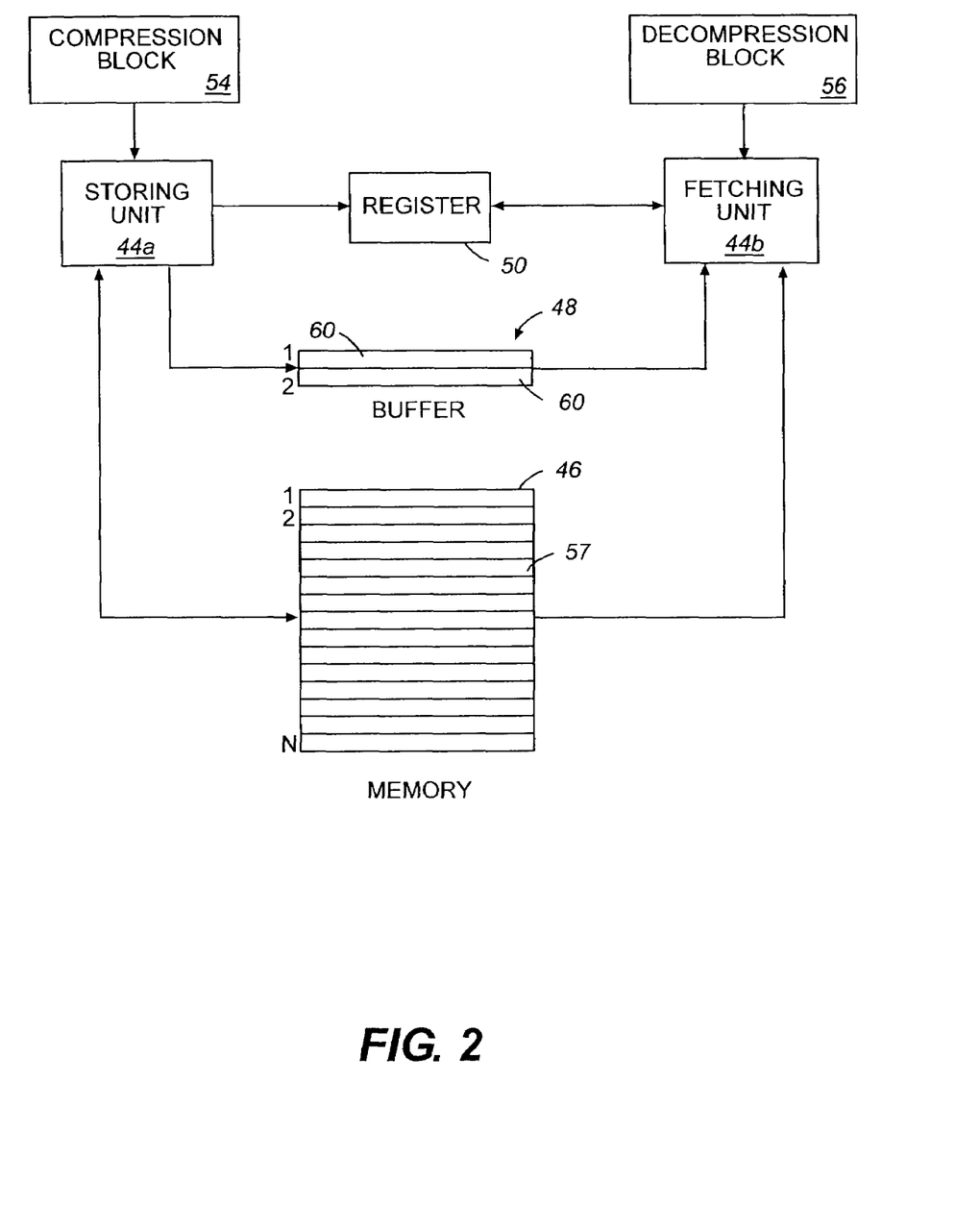
FIG. 2 is a simplified block diagram of a fetching unit, a storing unit and certain other components of the graphics engine of FIG. 1.

FIG. 2 shows the frame buffer 46, the buffer 48, the register 50, and the compression and decompression blocks 54, 56 of FIG. 1. The memory access unit 44 may include a storing unit 44a and a fetching unit 44, which are also shown in FIG. 2. In FIG. 2, the frame buffer 24 includes two or more memory segments 57 e.g., N memory segments, each of which may be used for storing one portion of a frame.

The buffer 48 may have capacity to store two coded portions of a frame. For this purpose, the buffer 48 includes two buffer segments 60. In alternative embodiments, the buffer 48 may have capacity to store three or more portions of a frame, but less than a full frame. In another embodiment, the buffer 48 may have capacity to store a single portion.

Where the compression block 54 compresses and stores image data as it is received, and the decompression block 56 reads and decompresses image data as it is needed by the display device, I have observed that a particular artifact sometimes occurs on the display screen 26a. This artifact may appear as one or more areas of black, white, or solid color in the rendered image. When a sequence of images is rendered as video on a display device, the artifact may appear momentarily as streaks of non-source pixels in one or more areas of the display. These artifacts are especially noticeable, and accordingly, a solution to this problem is plainly needed.

Figure 3:
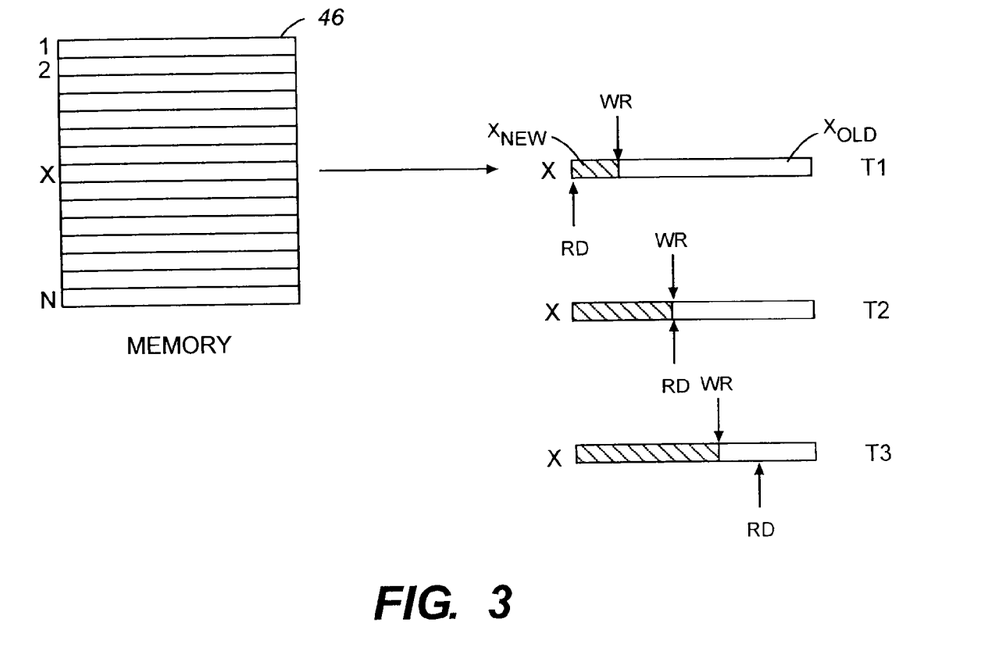
FIG. 3 is a simplified representation of a frame buffer and one line of the frame buffer at three points in time which illustrates one way that a particular type of image corruption may occur.
Figure 4:
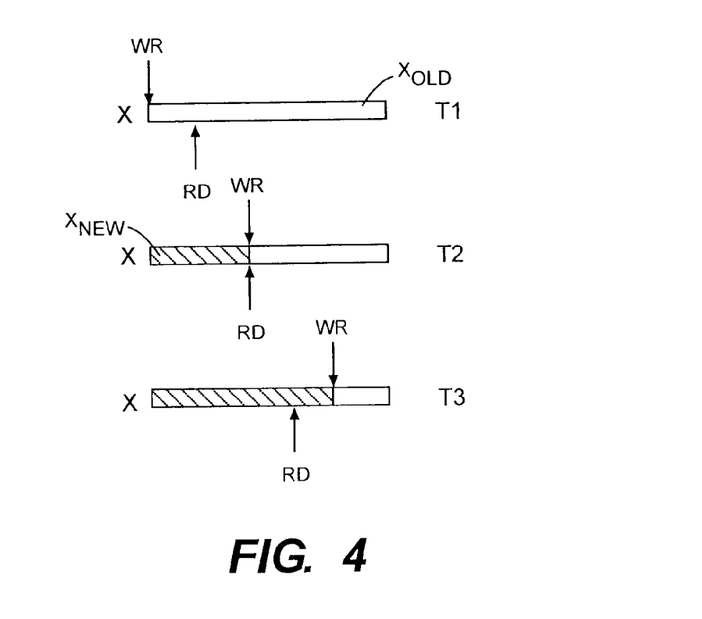
FIG. 4 is a simplified representation of one line of the frame buffer at three points in time which illustrates another one way that a particular type of image corruption may occur.

I have determined that these artifacts are a type of image corruption. In addition, I have discovered that the reason image corruption may occur is because the decompression block 56 can not handle data elements from two separately compressed portions. As mentioned, the decompression block 56 may use information from previous data in a portion to decode subsequent data in that portion. If the decompression block 56 is provided with data elements from two separately compressed portions, it uses an incorrect data element to decode another data element. I have determined that image corruption occurs because the decompression block 56 is provided with data elements from two separately compressed portions. FIGS. 3 and 4 illustrate how the decompression block 56 may be provided with data elements from two different portions.

FIG. 3 shows the frame buffer 46. In the examples shown in FIGS. 3 and 4, it is assumed that the data compression technique employed divides a frame of image data into portions that are equal to one line of the image. In other words, the data compression technique individually codes each line. The frame buffer 46 shown in FIG. 3 is divided into N segments. Each segment stores one compressed line. One of the segments is arbitrarily designated as line X.

In FIGS. 3 and 4, the line X of the frame buffer 46 is shown at three points in time: T1, T2, and T3, where T2 is after T1, and T3 is after T2. This convention for designating time points is also used FIGS. 5-7. In addition, arrows labeled "RD" and "WR" are shown. The "RD" arrow signifies the location of a read pointer and an arrow labeled "WR" signifies the location of a write pointer. In one embodiment, the storing unit 44a identifies a particular location in memory segment X for each datum in a coded portion that it is writing using the WR pointer. Similarly, the fetching unit 44b, in one embodiment, identifies a particular location in memory segment X for each datum in a coded portion that it is reading using the RD pointer.

Further, in this example, it is assumed that the frame buffer is not empty, i.e., a first frame was previously stored in the frame buffer 46. In addition, it is assumed that a second frame is in the process of being stored in the frame buffer. When a data element is stored at a particular memory location, the data element previously stored at that address is overwritten. Thus, a datum of the first frame may be overwritten when a corresponding datum of the second frame is stored. Data elements previously stored in segment X that are members of the first frame are designated $X_{OLD}$. Newly stored data elements of segment X that are members of the second frame are labeled $X_{NEW}$ (marked with rightward sloping, diagonal lines).

Referring to FIG. 3 at time T1, the first sequential data element of a line of the second frame corresponding with segment X is read for decompression and display, while a data element of the same line of the second frame is being stored in the frame buffer 46. It can be seen that the write-pointer WR is ahead of the read-pointer RD. At time T2, the read-pointer RD catches up with the write-pointer WR. This may be due to differences in the rate at which data are received and the rate at which data are read from the frame buffer 46, as described above. In this example, the read-pointer RD continues to move faster than the write-pointer WR and, at time T3, the read-pointer RD is well ahead of the write-pointer WR. FIG. 3 shows that the decompression block 56 is initially provided with coded data elements of a line (corresponding with segment X) of the second frame, but after the read-pointer RD passes the write-pointer WR, the decompression block 56 is provided with coded data elements of a line (corresponding with segment X) of the first frame. Thus, the decompression block 56 is provided with data elements from two different portions. However, when the decompression block 56 is provided with data elements from two separately compressed portions, image corruption may occur.

FIG. 4 also shows the line (corresponding with segment X) of the frame buffer 46 at three times T1, T2, and T3. FIG. 4 illustrates the write-pointer WR moving faster than the read-pointer RD. At time T1, the first sequential datum of a line of the second frame is being stored in the frame buffer 44 while a datum of a corresponding line of the first frame is being read for decompression and display. It can be seen that the read-pointer RD is ahead of the write-pointer WR at T1. At time T2, the write-pointer WR catches up with the read-pointer RD. And at time T3, the write-pointer WR is ahead of the read-pointer RD. FIG. 4 shows that the decompression block 56 is initially provided with coded data elements of a line (corresponding with segment X) of the first frame, but after the write-pointer passes the read-pointer RD, the decompression block 56 is provided with compressed data elements of a corresponding line of the second frame. Thus, the decompression block 56 is again provided with data elements from two different portions. And again, image corruption may occur as the decompression block 56 has been provided with data elements from two separately compressed portions.

The prevention of image corruption according to the present disclosure has two aspects that work together. The first aspect relates to storing compressed image data in the memory 46. Generally, as in the examples above, a first frame will have been stored in the frame buffer 46 at any time it is desired to store a second frame. The second frame may, but need not, be the next subsequent frame in a sequence of frames. Thus, a first data element, which is a member of a first portion of the first frame, will have been stored at a particular location in a particular segment in the frame buffer 46. A second data element is to be stored in the frame buffer 46. The second data element is a member of a second portion of the second frame. The first and second datum correspond sequentially within their respective portions, and the first and second portions correspond sequentially within their respective frames. Thus, the second datum will be stored at the same location of the same memory segment. Storing the second datum in the frame buffer 46 will overwrite the first datum. In order to prevent this problem, before the second data element is stored in the frame buffer 46, the first data element is copied from the memory 46 to the buffer 48. After the first data element is copied to the buffer 48, the second data element may be stored in the frame buffer 46.

The second aspect of prevention of image corruption relates to selecting a location to read compressed image data. An element of compressed data may be read either from the memory 46 or from the buffer 48. Again assuming that a first frame was previously stored in the memory 46 and a second frame is in the process of being stored, the determination of whether a particular datum of the first frame will be read from the frame buffer 46 or from the buffer 48 depends on the positional relationship between the datum of the first frame that is currently being read and the datum of the second frame currently being stored. The process for selecting a location to read coded image data is further described below.

The position of a datum of the first frame that is currently being read, and the position of a datum of the second frame currently being stored may be identified using pointers. With respect to the latter, the WR pointer identifies a particular location in a memory segment for each coded datum of a portion that is to be stored in the segment. In addition, a write segment-pointer ("WR LN") may be provided. The WR LN pointer identifies a particular segment in the memory 46 for each portion of a frame that is to be stored in the memory. With regard to the former, the RD pointer identifies a particular location in a memory segment for each coded datum of a portion previously stored in the segment and that is to be fetched. Further, a read-segment pointer ("RD LN") may be generated. The RD LN pointer may be used to identify a particular segment in the memory 46 for each portion of a frame that was previously stored in the memory.

While the RD pointer identifies a location in a particular segment of the memory 46 for each datum of a portion stored in that segment, the datum may be fetched from the memory 46 or from a corresponding location in the buffer 48. Thus, the RD pointer may also identify a corresponding location in the buffer 48. In addition, while the RD LN and WR LN pointers are not explicitly shown in FIGS. 5-7, the position of these pointers may be inferred from the line that the RD and WR pointers, respectively, point to.

In one embodiment, the WR and WR LN pointers may be generated by the storing unit 44a. In addition, in an embodiment, the RD and RD LN pointers may be generated by the fetching unit 44b. In other embodiments, any of the pointers may be generated by alternative logic or units within or external to the graphics engine 22. For instance, the host 24 or the image sensor 28 may specify a memory segment to write a particular portion. As another example, the compression block 54, may specify a memory segment and a location within the segment to write a particular coded datum. Similarly, the decompression block 56, may specify a memory segment and a location within the segment to read a particular coded datum.

Figure 5:
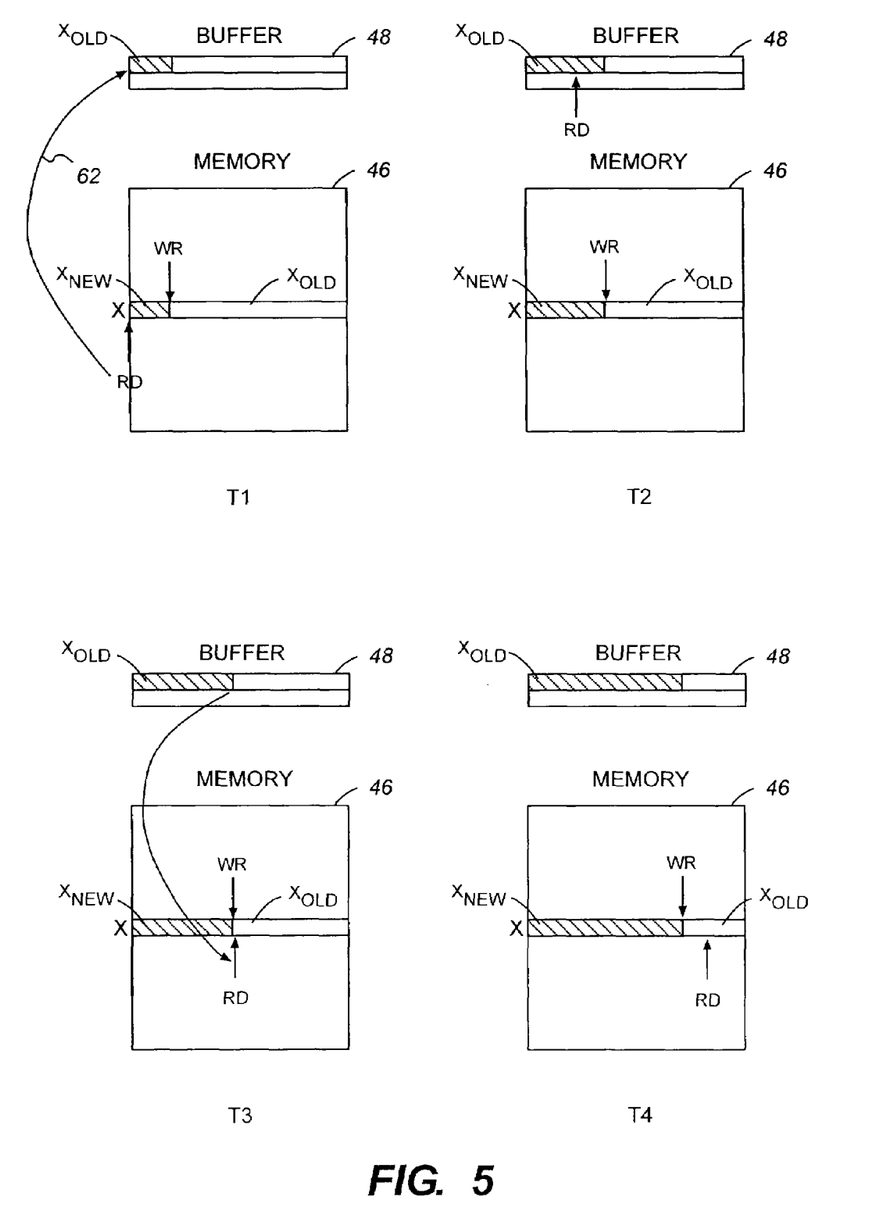
FIG. 5 illustrates a first example of preventing image corruption according to the present disclosure in a situation in which the fetching unit of FIG. 2 is reading compressed image data faster than the storing unit is writing compressed image data.

FIG. 5 illustrates one example of preventing image corruption according to the present disclosure. FIG. 5 shows the frame buffer 46 and the buffer 48 at four points in time.

Figure 6:
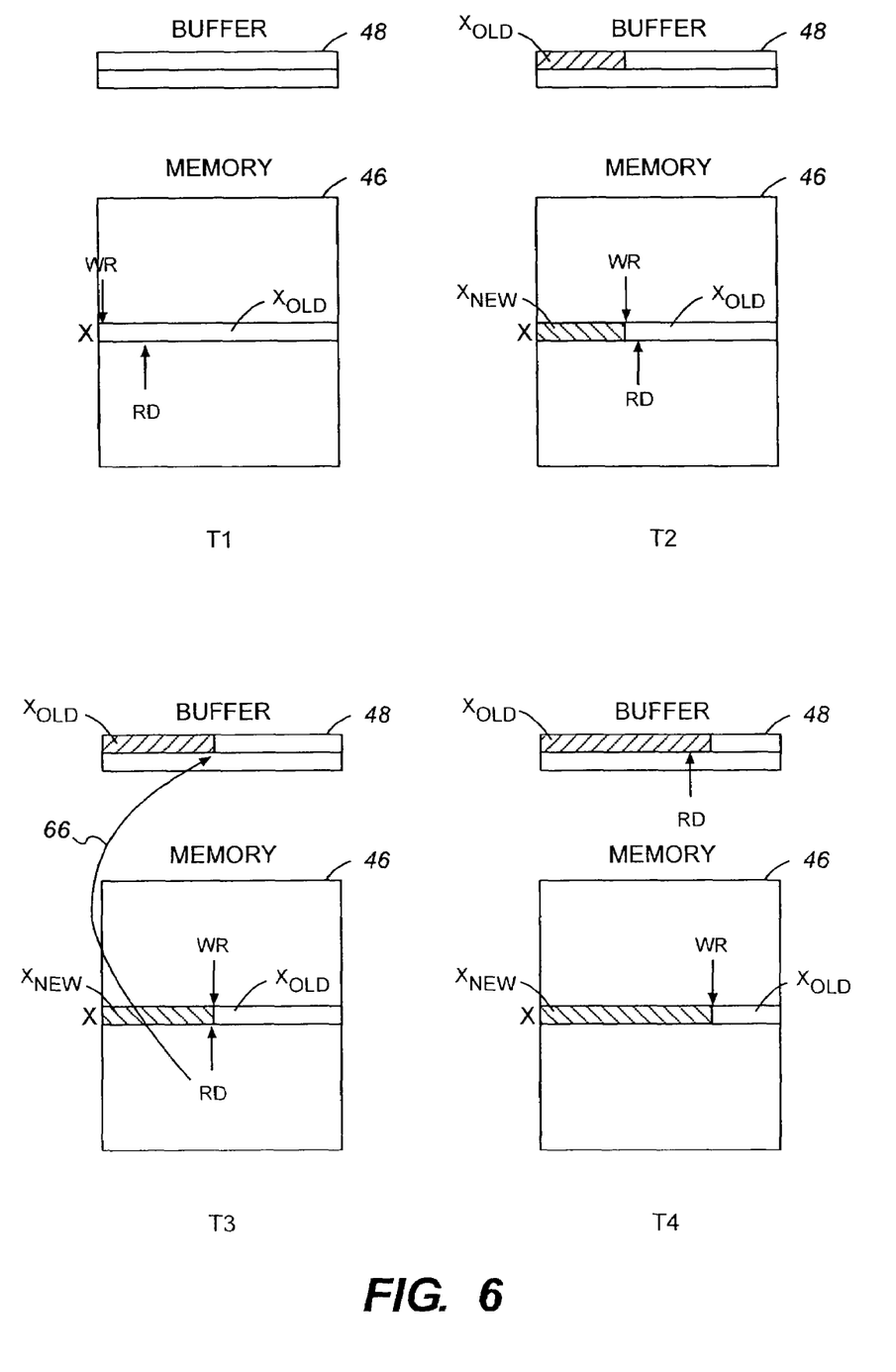
FIG. 6 illustrates a second example of preventing image corruption according to the present disclosure in a situation in which the storing unit of FIG. 2 is writing compressed image data faster than the fetching unit is reading compressed image data.
Figure 7A:
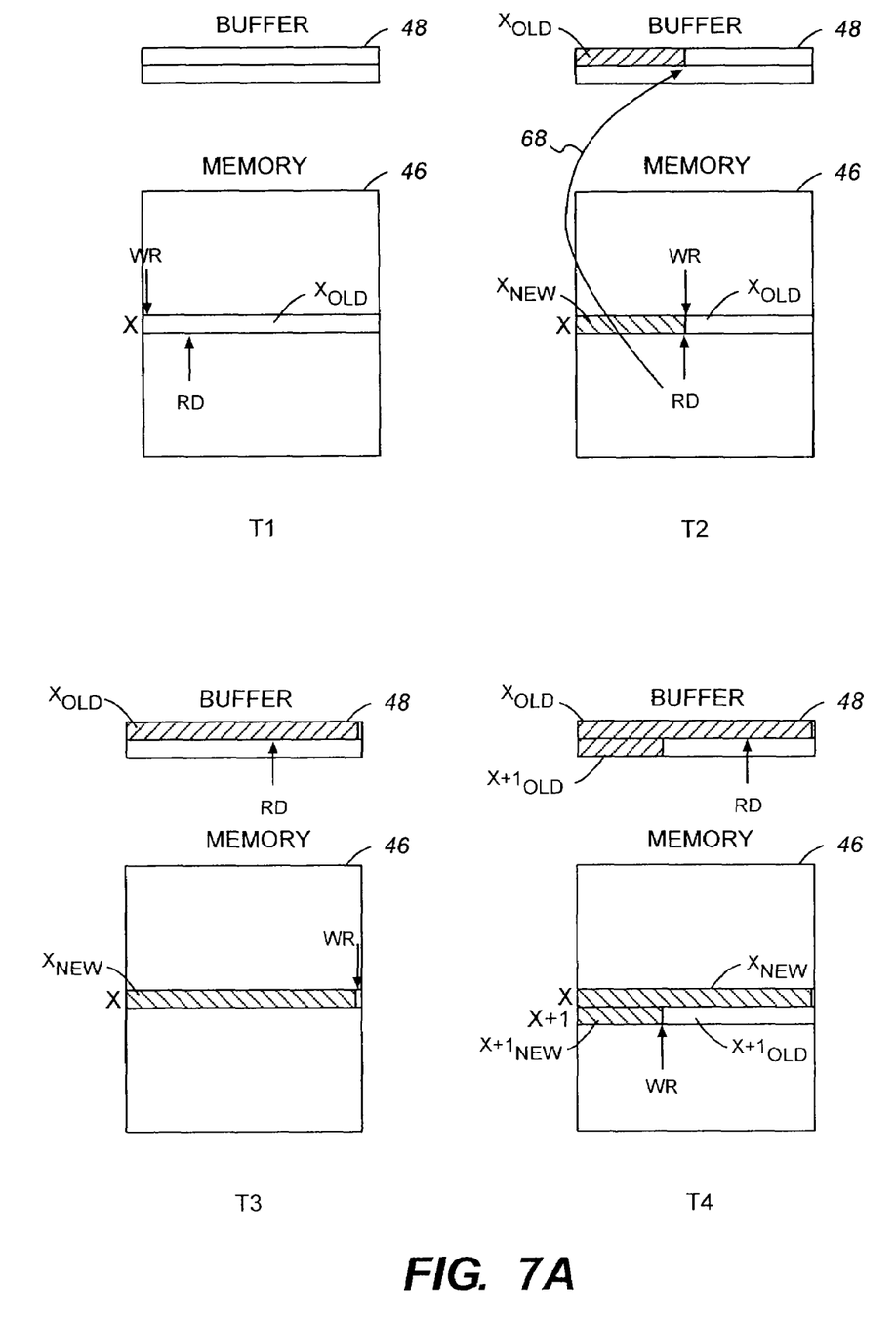
FIGS. 7A and 7B illustrate a third example of preventing image corruption according to the present disclosure in a situation in which the storing unit of FIG. 2 is writing compressed image data faster than the fetching unit is reading compressed image data for several lines.
Figure 7B:
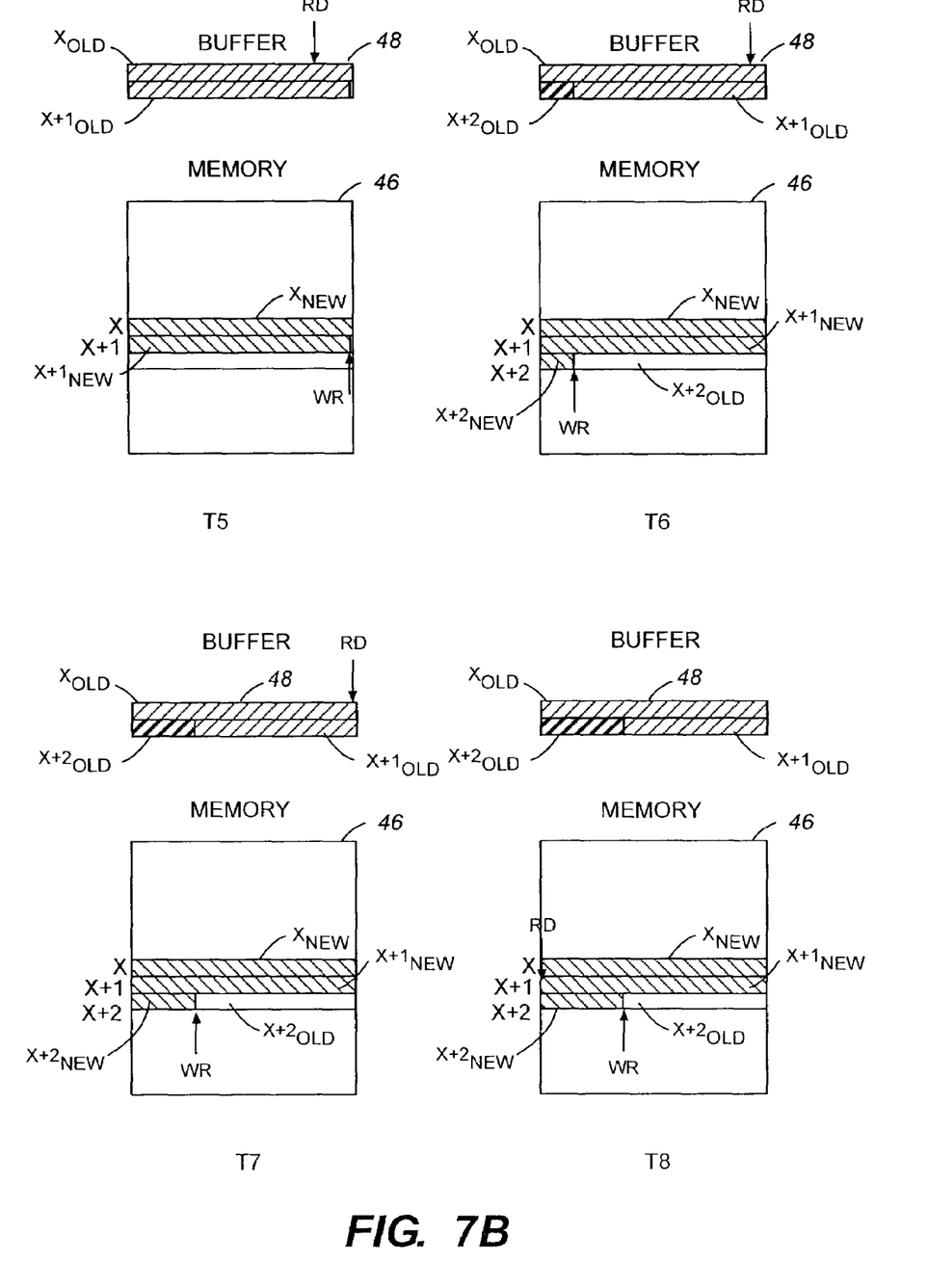

FIG. 5 illustrates an example where a first frame has been divided into portions, e.g., lines, each portion individually compressed, and stored in the frame buffer 46 in distinct memory segments. A second frame is in the process of being stored in the memory 46. The second frame, like the first frame, is divided into portions, which are each compressed individually. As mentioned, one aspect of preventing image corruption relates to how data of the second frame is stored. Before a datum of the second frame is stored in the memory 46, a corresponding datum of the first frame previously stored in the memory is copied to the buffer 48. In FIGS. 5-7, datum of the second frame are designated $X_{NEW}$ (marked with rightward sloping, diagonal lines). In addition, data of the first frame are designated $X_{OLD}$ and, when stored in the buffer 48, the locations containing such data of the first frame are marked with leftward sloping, diagonal lines. As the WR pointer advances at times T1 to T4, it can be seen that the amount of first frame data stored in the buffer 48 increases in tandem with the amount of second frame data stored in the memory 46. It can also be seen that the first frame data stored in segment X of the memory is stored in a first of two segments of the buffer 48.

In addition, the example of FIG. 5 shows a situation where the fetching unit 44b is reading compressed image data faster than the storing unit 44a is writing compressed image data. Referring to time T1, it can be seen that the fetching unit 44b is starting to read a compressed line X of a first frame, while at the same time the storing unit 44b is in the process of writing a corresponding line X of a second frame. At T1, the fetching unit 44b determines if the storing unit 44a is writing to the same line X that the fetching unit 44b intends to read from next. If RD LN is equal to WR LN, the storing unit 44a is writing to the same line X that the fetching unit 44b intends to read. In fact, RD LN is equal to WR LN at T1, and in this case, the fetching unit 44b next determines whether the data element it intends to read next is ahead of the data element that the storing unit 44a intends to store next. To make this determination, the fetching unit 44b may compare the positions of the read- and write-pointers, RD and WR. At time T1, the WR pointer is greater than the RD pointer, indicating that the data element that the storing unit 44a intends to store next is ahead of the data element that the fetching unit 44b intends to read next. In this case, the fetching unit 44b determines the location where it will next read a data element is the buffer 48. The result of this determination is shown in FIG. 5 by an arrow 62, which points from the RD pointer to the buffer 48 at time T1. As the fetching unit 44b prepares to read subsequent data elements, it makes additional determinations as to where the image data should be fetched, i.e., the frame buffer 46 or the buffer 48. At time T2, it can be seen that the fetching unit 44b continues to read data elements from the buffer 48. The reason is that at T2 the next data element that the storing unit 44a intends to store remains ahead of the next data element that the fetching unit 44b intends to read. At time T3 the fetching unit 44b determines that the next data element to be read is ahead of the data element most recently written. As a consequence, the fetching unit 44b switches read locations and reads the data element from the frame buffer 46, as shown by the arrow 64. At time T4, the next data element that the fetching unit 44b intends to read is still ahead of the next data element that the storing unit 44a intends to store. Accordingly, the fetching unit 44b continues to read from the frame buffer 46. As FIG. 5 illustrates, fetching unit 44b at all times reads compressed image data from a single portion, i.e., line X of the first frame. This ensures that the type of image corruption described above is prevented.

FIG. 6 shows another example of the prevention of image corruption according to the present disclosure. FIG. 6 shows the frame buffer 46 and the buffer 48 at four points in time. As in FIG. 5, the portions in the example of FIG. 6 are coded lines of an image.

FIG. 6 illustrates a situation where the storing unit 44a is writing compressed image data faster than the fetching unit 44b is reading compressed image data. Referring to time T1, it can be seen that the storing unit 44a is starting to write a line X of a second frame, while at the same time the fetching unit 44b is in the process of reading a corresponding line X of a first frame. At T1, the fetching unit 44b determines if the storing unit 44a is writing to the same line X that the fetching unit 44b intends to read from next. In FIG. 6, RD LN is equal to WR LN at T1, indicating that the storing and fetching units are accessing the same line X. In this situation, the fetching unit 44b next determines whether the data element it intends to read next is ahead of the data element that the storing unit 44a intends to store next. As the figure illustrates, the RD pointer is ahead of the WR pointer at T1, which indicates that data element that the reading unit 44b intends to read next is ahead of the data element that the storing unit 44a intends to write next. In this case, the fetching unit 44b determines that the location where it will next read a data element is the frame buffer 46. As the fetching unit 44a prepares to read subsequent data elements, it makes additional determinations as to where a particular coded datum should be fetched. At time T2, it can be seen the data element that the fetching unit 44b will read next is ahead of the data element that the storing unit 44b will store next. For this reason, the fetching unit 44b reads a data element from the frame buffer 46 at time T2. At time T3, the fetching unit 44b determines that the data element that the storing unit 44b will store next is ahead of the data element that the fetching unit 44b will read next. In this case, the fetching unit 44b determines that the location where it will read the datum that it intends to read next is the buffer 48. As shown by the arrow 66, the fetching unit 44b switches read locations and reads a data element from the buffer 48 at T3. At time T4, the next data element that the storing unit 44a will store is still ahead of the next data element that the fetching unit 44b will read. Consequently, the fetching unit 44b continues to read from the buffer 48. As FIG. 5 illustrates, fetching unit 44b at all times reads compressed image data from a single portion, i.e., line X of the first frame, ensuring that image corruption is prevented.

Within any given frame, the RD and WR pointers may pass one another multiple times. As mentioned above, there are several reasons for this. For example, the quantity of coded data may vary from portion to portion depending on the nature of the data. Accordingly, the time that it takes for the storing and fetching unit to respectively write and read a portion of data may vary for corresponding portions of first and second frames. The example presented above with respect to FIG. 5 shows how image corruption may be prevented according to the present disclosure when compressed image data is being read faster than it is being written, i.e., when the RD pointer passes WR pointer. Likewise, the example presented above with respect to FIG. 6 shows how image corruption may be prevented according to the present disclosure when compressed image data is being written faster it is being read, i.e., when the WR pointer passes RD pointer. Therefore, image corruption may be prevented in both situations.

FIGS. 7A, 7B illustrate another example of preventing image corruption according to the present disclosure. The exemplary buffer 48 shown in FIGS. 2, 5, 6, 7a, and 7B has a capacity to store two coded portions, e.g., two coded lines of data. FIGS. 7A, 7B illustrate the utility of providing the capacity to store two portions. FIGS. 7A, 7B, in combination, show the frame buffer 46 and the buffer 48 at eight points in time. In the example presented in FIGS. 7A, 7B, like the example of FIG. 6, the storing unit 44a is writing compressed image data faster than the fetching unit 44b is reading compressed image data. This example differs from that shown in FIG. 6 in that the storing unit 44a maintains its speed advantage beyond a single portion.

As described above, one aspect of preventing image corruption provides for copying a datum of a first frame previously stored in the memory 46 to the buffer 48 before a corresponding datum of a second frame is stored in the memory 46. If the storing unit 44a is writing data to a particular segment of the frame buffer 46 faster than the fetching unit 44b is reading data, the storing unit 44a may finish storing the segment and begin storing the portion stored in the next subsequent segment, e.g., X+1. When this situation occurs, the second segment of the buffer 48 is used. As illustrated in FIGS. 7A, 7B, the portion of the first frame stored in a subsequent segment of the memory 46, e.g., X+1, is copied to the second segment of the buffer 48. For example, at T4, it can be seen that data of the first frame designated $X+1_{OLD}$ is copied to the second segment of the buffer 48. Moreover, the storing unit 44a may be writing data with sufficient speed with respect to the speed at which the fetching unit 44b is reading data that the storing unit 44a may not only finish writing the current segment, but it may also finish writing the next segment and begin writing a second subsequent segment, e.g., X+2. When the storing unit 44a is writing any such subsequent segment, and the buffer 48 has capacity to store two segments, if the fetching unit is currently reading one of the segments of the buffer 48, the storing unit copies the "old" data of the first frame to the segment of the buffer 48 that the fetching unit 44b is not reading. For example, at T7, it can be seen that data of the first frame designated $X+2_{OLD}$ is copied to the second segment of the buffer 48. Note that at T7, $X+2_{OLD}$ overwrites $X+1_{OLD}$ stored in the second segment of the buffer 48.

Turning now to the fetching of data of the first frame and referring to T1, FIG. 7A, it can be seen that the storing unit 44a is starting to write line X of a second frame, and the fetching unit 44b is in the process of reading the corresponding line X of a first frame. The fetching unit 44b first determines if the storing unit 44a is writing to the same line X that the fetching unit 44b is currently reading. If RD LN is equal to WR LN, the fetching unit next determines if the current read-pointer RD is greater than the current write-pointer WR. At T1, the storing and fetching units 44a, 44b are writing to the same line, and the read-pointer RD is greater than (ahead of) the write-pointer WR. Therefore, the fetching unit 44b reads a data element from the frame buffer 46 at T1. At T2, the units 44a, 44b are both accessing the same line X, but at this point the write-pointer WR passes the read-pointer RD so the fetching unit 44b switches to reading from the buffer 48, as designated by the arrow 68. At T3, the storing unit 44a writes the last data element of line X of the second frame to frame buffer 46, while the fetching unit 44b continues to read line X of the first frame from the buffer 48.

Referring to T4, FIG. 7A, the storing unit 44a is writing line X+1 of the second frame to the frame buffer 46. Before the storing unit 44a writes a particular data element of line X+1 of the second frame to the frame buffer 46, it copies the corresponding data element of line X+1 of the first frame to the buffer 48, indicated in FIG. 7A as X+1$_{OLD}$. The storing unit 44a copies the line X+1$_{OLD}$ to a second segment of the buffer 48, because the fetching unit is currently fetching data from the first segment of the buffer. In addition, the fetching unit 44b determines at T4 whether RD LN is equal to WR LN. It can be seen that RD LN is not equal to WR LN at T4. Therefore, the fetching unit 44b determines that the data element that it intends to read next is to be read from the buffer 48.

Continuing the example, but referring now to FIG. 7B, the storing unit 44a, at T5, is currently writing the last data element of line X+1 to frame buffer 46. After writing the last data element of line X+1, the storing unit 44a will start writing line X+2. At T5, the fetching unit 44b determines whether RD LN is equal to WR LN. Again, RD LN is not equal to WR LN, and the fetching unit 44b determines that the location for reading a current datum is the buffer 48.

At T6, the storing unit 44a is writing the line X+2 to the frame buffer 46. As the storing unit 44a writes line X+2 of the second frame to the frame buffer 46, it copies data elements of line X+2 of the first frame to the second segment of the buffer 48, indicated in the figure as X+2$_{OLD}$.

At T7, the fetching unit 44b reads the last data element of line X from the buffer 48, and at T8, the next data element that the fetching unit 44b intends to read is the first sequential data element of line X+1. The fetching unit 44b determines whether the next data element that it intends to read will be read from the frame buffer 46 or from the buffer 48. Because the storing unit 44a is currently writing the line X+2 and the fetching unit 44b intends to read line (X+1), RD LN does not equal WR LN. In addition, the fetching unit 44b determines that current datum is first datum in a segment. In this case (RD LN≠WR LN, and RD=first datum in segment), the fetching unit 44b determines that the location of the data element that it intends to read next is the frame buffer 46.

Figure 8:
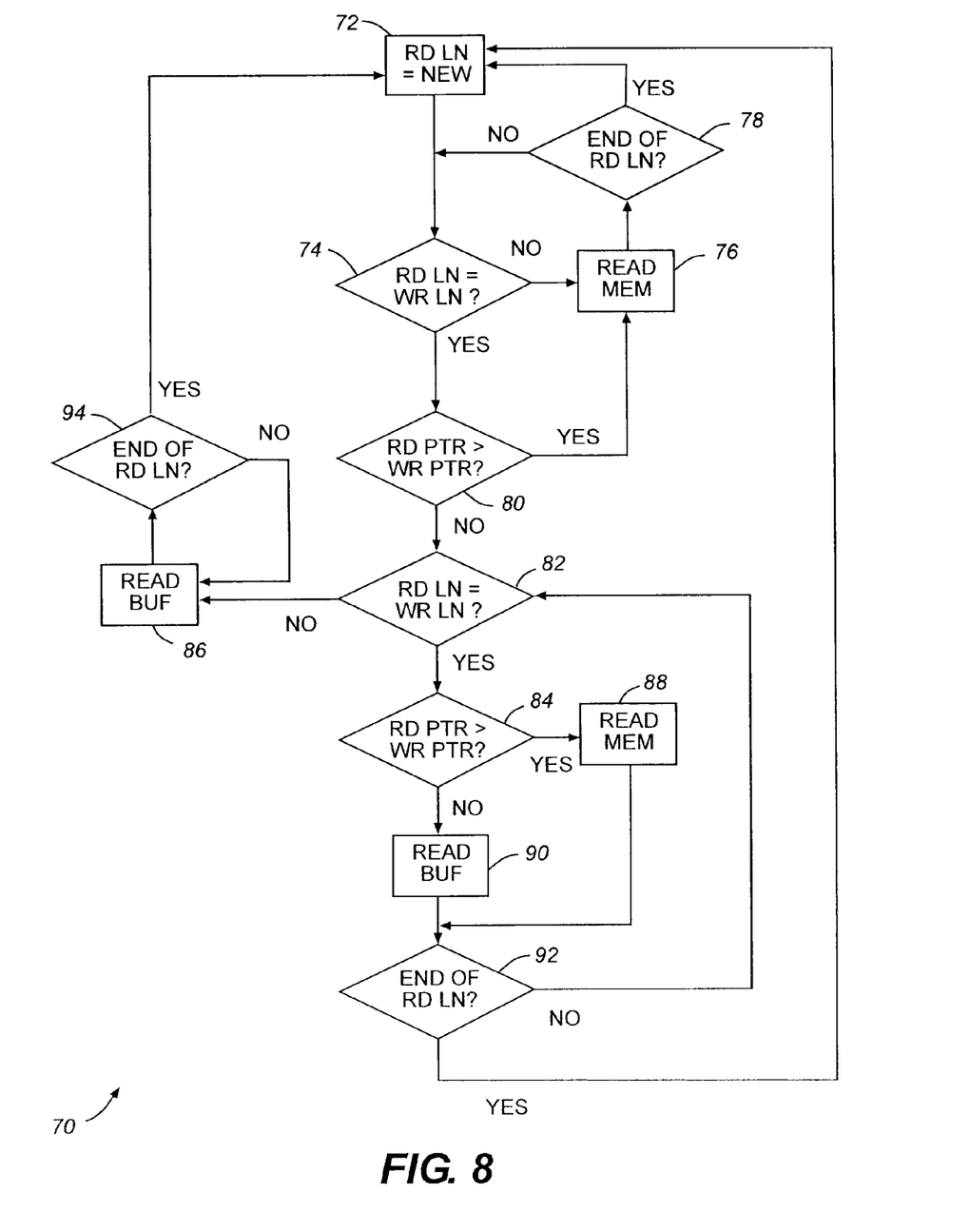
FIG. 8 is a flow diagram of an exemplary method embodying principles of the invention.

FIG. 8 illustrates a method 70 for reading a frame according to one embodiment of the present disclosure. The method 70 is generally applicable to groups of data, e.g., frames, that may be divided into portions for some purpose, such as to individually compress the portions, where the groups of data, the portions, and the datum within each portion are ordered. However, for convenience of explanation and in accordance with one embodiment, the method 70 is described with respect to frames of raster ordered pixels, where each line has been individually coded. However, the method 70 is applicable to data having other groupings and other portions, and is not limited to pixel data. Generally consistent with the usage above, WR LN is a count value that refers to the sequential position of the line currently being written (or to be written next), and "RD LN" is a count value that refers to the sequential position of the line currently being read (or a new line to be read next). In FIG. 8, RD LN=NEW indicates that the first sequential data element of a new line is to be read. In addition, WR PTR and RD PTR refer to the sequential position of a particular datum within a line.

It is assumed that a first frame is stored in a memory and that a buffer is available for storing at least one of the lines of the first frame. In addition, it is assumed that a second frame is simultaneously being stored in the memory. The method 70 may begin with a first data element of a new line of the first frame (step 72).

It is determined if the RD LN is equal to WR LN, i.e., is the new line to be read the same line that is currently being written (step 74). The line currently being written may be a member of the second frame. If RD LN is not equal to WR LN, the first data element is read from the memory (step 76). After a datum is read from the memory in step 76, it is determined if that datum is the last data element of the line corresponding with the current value of RD LN (step 78). If it is not the last data element of the line, the method returns to step 74. On the other hand, if it is the last data element, the method returns to beginning point 72.

If RD LN is equal to WR LN in step 74, it is next determined (step 80) if the RD pointer is greater than WR pointer. If the RD pointer is greater than WR pointer, the current datum is read from the memory (step 76). Otherwise, the method proceeds to step 82.

In step 82, it is determined if RD LN is equal to WR LN. If RD LN is equal to WR LN, the method 70 proceeds to step 84. On the other hand, If RD LN is not equal to WR LN, the method 70 proceeds to step 86.

In step 84, a determination is made if RD PTR is greater than WR PTR. If RD PTR is greater than WR PTR, the next data element to be read is read from the memory in step 88. On the other hand, if RD PTR is not greater than WR PTR, the next data element to be read is read from the buffer in step 90. Regardless of whether the next data element to be read is read from the memory (step 88) or the buffer (step 90), after the data element has been read, it is determined in step 92 if that datum is the last data element of the line. If it is not the last data element of the line, the method returns to step 82. On the other hand, if it is the last data element, the method returns to beginning point 72.

In step 86, the current datum is read from the buffer. After the current datum is read, it is determined in step 94 if that datum is the last data element of the line. If it is not the last datum of the line, the method returns to step 86, where the next subsequent datum to be read is read from the buffer. On the other hand, if it is the last data element of the line, the method returns to beginning point 72.

Method embodiments of the present disclosure may be implemented in hardware, or software, or in a combination of hardware and software. Where all or part of a method is implemented in software, a program of instructions may include one or more steps of a method and the program may be embodied on machine-readable media for execution by a machine. Machine-readable media may be magnetic, optical, or mechanical. A few examples of machine readable media include floppy disks, Flash memory, optical disks, bar codes, and punch cards. Some examples of a machine include disk drives, processors, USB drives, optical drives, and card readers. The foregoing examples are not intended be exhaustive lists of media and machines. In one embodiment, a method according to the present disclosure may be practiced in a computer system, such as the computer system 20.

Reference is made primarily to compressed image data in this disclosure. According to one embodiment, the principles of this invention may be practiced with uncompressed image data. In another embodiment, the principles of this invention may be practiced with compressed audio data, such as MP3, WMA, WAV type data.

Embodiments of the claimed inventions may be used in a "mobile device." A mobile device, as the phrase is used in this description and the claims, means a computer or communication system, such as a mobile telephone, personal digital assistant, digital music player, digital camera, or other similar device. Embodiments of the claimed inventions may be employed in any device capable of processing image data, including but not limited to computer and communication systems and devices generally.

The term "display device" is used in this description and the claims to refer to any type of device capable of rendering images. For example, the term display device is intended to include hardcopy devices, such as printers and plotters. The term display device additionally refers to all types of display devices, such as CRT, LED, OLED, and plasma devices, without regard to the particular display technology employed.

In this document, particular structures, processes, and operations well known to the person of ordinary skill in the art may not be described in detail in order to not obscure the description. As such, embodiments of the claimed inventions may be practiced even though such details are not described. On the other hand, certain structures, processes, and operations may be described in some detail even though such details may be well known to the person of ordinary skill in the art. This may be done, for example, for the benefit of the reader who may not be a person of ordinary skill in the art. Accordingly, embodiments of the claimed inventions may be practiced without some or all of the specific details that are described.

In this document, references may be made to "one embodiment" or "an embodiment." These references mean that a particular feature, structure, or characteristic described in connection with the embodiment is included in at least one embodiment of the claimed inventions. Thus, the phrases "in one embodiment" or "an embodiment" in various places are not necessarily all referring to the same embodiment. Furthermore, particular features, structures, or characteristics may be combined in one or more embodiments.

Although embodiments have been described in some detail for purposes of clarity of understanding, it will be apparent that certain changes and modifications may be practiced within the scope of the appended claims. Accordingly, the described embodiments are to be considered as illustrative and not restrictive, and the claimed inventions are not to be limited to the details given herein, but may be modified within the scope and equivalents of the appended claims. Further, the terms and expressions which have been employed in the foregoing specification are used as terms of description and not of limitation, and there is no intention in the use of such terms and expressions to exclude equivalents of the features shown and described or portions thereof, it being recognized that the scope of the inventions are defined and limited only by the claims which follow.

I claim:

1. An apparatus comprising:
    a memory to store one of at least two frames of coded data, the frames being divided into portions, each of the portions being individually coded, wherein the memory is divided into segments, each of the segments to store a portion;
    a buffer to store at least one portion;
    a first unit to (a) copy a datum stored at a particular location in the memory to the buffer, and (b) to store a datum of a first frame at the particular location, (a) being performed before (b), wherein, a write-segment pointer to identify a particular memory segment and a write-data pointer to identify a location within the particular memory segment are generated for the datum of the first frame; and
    a second unit to fetch a datum of a second frame from a selected location, wherein, a read-segment pointer to identify a particular memory segment and a read-data pointer to identify a location within the particular memory segment are generated for the datum of the second frame, and wherein, if (a) the write-segment pointer and the read-segment pointer identify an identical memory segment, and the read-data pointer is greater than the write-data pointer, the memory is selected, and if (b) the write-segment pointer and the read-segment pointer identify an identical memory segment, and the write-data pointer is greater than the read-data pointer, the buffer is selected.

2. The apparatus of claim 1, wherein if the write-segment pointer and the read-segment pointer identify different memory segments, the memory is selected.

3. The apparatus of claim 1, wherein if (a) the write-segment pointer and the read-segment pointer identify different memory segments for the datum of the second frame, and if (b) there exists a previous datum within the segment identified by the read-segment pointer for the second frame datum for which (i) the write-segment pointer and the read-segment pointer identify an identical memory segment, and (ii) the write-data pointer is greater than the read-data pointer, the buffer is selected.

4. The apparatus of claim 2, wherein the datum of the first frame and the datum of the second frame include image data.

5. The apparatus of claim 3, wherein the buffer stores two portions.

6. The apparatus of claim 3, wherein the portions correspond with lines of a frame.

7. The apparatus of claim 3, wherein the buffer is distinct from the memory.

8. A method comprising:
    providing first and second frames of data, the frames being divided into portions;
    storing the first frame in a memory, the memory being divided into segments, each segment to store a portion, the storing including copying data stored at a particular location in the memory to a buffer before storing data of the first frame at the particular location, the buffer to store at least one portion;
    generating a write-segment pointer to identify a particular memory segment and a write-data pointer to identify a location within the particular memory segment for each datum of the first frame;
    generating a read-segment pointer to identify a particular memory segment and a read-data pointer to identify a location within the particular memory segment for each datum of the second frame;
    selecting locations to fetch data of the second frame, wherein, if (a) the write-segment pointer and the read-segment pointer identify an identical memory segment, and the read-data pointer is greater than the write-data pointer, then the memory is selected, and if (b) the write-segment pointer and the read-segment pointer identify an identical memory segment, and the write-data pointer is greater than the read-data pointer, then the buffer is selected; and
    fetching the second frame from the selected locations.

9. The method of claim 8, wherein if the write-segment pointer and the read-segment pointer identify different memory segments, then the memory is selected.

10. The method of claim 8, wherein if (a) the write-segment pointer and the read-segment pointer identify different memory segments for a current datum, and if (b) there exists a previous datum within the segment identified by the read-segment pointer for the current datum for which (i) the write-segment pointer and the read-segment pointer identify an identical memory segment, and (ii) the write-data pointer is greater than the read-data pointer, then the buffer is selected.

11. The method of claim 10, further comprising individually coding each portion.

12. The method of claim 8, further comprising individually coding each portion.

13. The method of claim 11, wherein the data is pixel data.

14. A system comprising:

a memory to store one of at least two frames of data, the frames being divided into portions, wherein the memory is divided into segments, each segment to store a portion;

a buffer to store at least one portion;

a first unit to (a) copy a datum stored at a particular location in the memory to the buffer, and (b) to store a datum of a first frame at the particular location, (a) being performed before (b), wherein, for the datum of the first frame, a write-segment pointer to identify a particular memory segment and a write-data pointer to identify a location within the particular memory segment are generated; and a second unit to fetch a datum of a second frame from a selected location, wherein, for the datum of the second frame, a read-segment pointer to identify a particular memory segment and a read-data pointer to identify a location within the particular memory segment are generated, and wherein, if (a) the write-segment pointer and the read-segment pointer identify an identical memory segment, and the read-data pointer is greater than the write-data pointer, the memory is selected, and if (b) the write-segment pointer and the read-segment pointer identify an identical memory segment, and the write-data pointer is greater than the read-data pointer, the buffer is selected.

15. The system of claim 14, wherein if the write-segment pointer and the read-segment pointer identify different memory segments, the memory is selected, and wherein if (a) the write-segment pointer and the read-segment pointer identify different memory segments for the datum of the second frame, and if (b) there exists a previous datum within the segment identified by the read-segment pointer for the second frame datum for which (i) the write-segment pointer and the read-segment pointer identify an identical memory segment, and (ii) the write-data pointer is greater than the read-data pointer, the buffer is selected.

16. The system of claim 15, further comprising an encoder for individually coding each portion.

17. The system of claim 16, wherein the data is raster ordered pixel data.

18. The system of claim 17, wherein the buffer stores two portions and is distinct from the memory.

19. The system of claim 18, further comprising an image data source and a display device, wherein the image data source provides pixel data at a first rate which may not be paused without data loss.

20. The system of claim 18, further comprising a display device requiring pixel data at a first rate that may not be paused without providing the display device with incomplete frame refresh data.

* * * * *